United States Patent [19]

Pietsch

[11] Patent Number: 5,272,633

[45] Date of Patent: Dec. 21, 1993

[54] VEHICLE SEAT

[75] Inventor: Helge Pietsch, Detmold, Fed. Rep. of Germany

[73] Assignee: Gebr. Isringhausen, Fed. Rep. of Germany

[21] Appl. No.: 690,963

[22] PCT Filed: Sep. 6, 1990

[86] PCT No.: PCT/EP90/01491

§ 371 Date: May 13, 1991

§ 102(e) Date: May 13, 1991

[87] PCT Pub. No.: WO91/04168

PCT Pub. Date: Apr. 4, 1991

[30] Foreign Application Priority Data

Sep. 13, 1989 [DE] Fed. Rep. of Germany ....... 3930612

[51] Int. Cl.⁵ .............................................. G06F 15/20
[52] U.S. Cl. .................. 364/424.05; 318/663; 296/65.1
[58] Field of Search ................. 364/424.01, 424.05; 318/652, 663, 467; 296/65.1

[56] References Cited

U.S. PATENT DOCUMENTS

| | | | |
|---|---|---|---|
| 4,267,494 | 5/1981 | Matsuoka et al. | 318/568 |
| 4,404,632 | 9/1983 | Harada et al. | 364/425 |
| 4,463,426 | 7/1984 | Caddick et al. | 364/424.05 |
| 4,812,838 | 3/1989 | Tashiro et al. | 340/825.06 |
| 4,845,620 | 7/1989 | Parker | 364/424.05 |
| 4,922,426 | 5/1990 | Obara et al. | 364/424.05 |
| 4,967,178 | 10/1990 | Saito et al. | 364/424.05 |
| 5,136,221 | 8/1992 | Takizawa et al. | 318/567 |

Primary Examiner—Thomas G. Black
Attorney, Agent, or Firm—Salter, Michaelson & Benson

[57] ABSTRACT

The invention concerns a pneumatic spring-mounted vehicle seat with an electronic control, which controls at least the air valves of the pneumatic spring as a function of the swing strokes of the rocker system. It is proposed that an accurate analogous-path and time-equal electrical pattern be produced with only one swing stroke sensor for the swing strokes, and this sensor is applied continually to the input of a microprocessor, and thus this pattern can be compared, during the operational state of the seat and in constant recurring program sequences, with preset and, as the case may be, changeable event theoretical values.

9 Claims, 1 Drawing Sheet

VEHICLE SEAT

BACKGROUND AND SUMMARY OF THE INVENTION

The invention concerns a vehicle seat with a mechanical rocker system, which is spring mounted by means of a pneumatic spring and with an electronic control, which controls air valves for aerating or de-aerating the pneumatic spring as a function of the swing strokes of the rocker system.

Electronic controls for pneumatic seats are known, for example, from DE Auslegeschrift (Examined) 2,736,242 and from DE Patent 3,312,732. They are designed each time for very specific control functions and produce output signals for this purpose, e.g., for switching on an adjusting motor or for monitoring the theoretical middle position of a pneumatic seat by aerating or de-aerating the pneumatic spring. Such controls operate as a function of the swing strokes of the rocker system in that usually two or more sensors sense specific positions, which are travelled over by the rocker system, i.e., given as input signals to the electronic control.

In practice, such controls require a precise adjustment of the sensor, whereby the respective mounting positions of the sensor may be very different on the rocker system, depending on what type of seat or what type of rocker system is used and/or which control function will be carried out with the electronic control. If several control functions will be realized, such as e.g., switching on the air valves for aerating and de-aerating the pneumatic spring and/or connecting or disconnecting an additional air volume, etc., then a corresponding number of sensors must be mounted on the rocker system and adjusted.

The task of the invention is to create a pneumatic-spring mounted vehicle seat with an electronic control, which is mounted essentially in a more simple way with respect to the electronic control, whereby at the same time several control functions can be realized, without increasing in this way the expenditure for positioning and adjusting the sensors.

This task is resolved by the invention in that the rocker system has one swing stroke sensor, which continually gives off an uninterrupted sequence of electrical signals during the operational state of the seat, which represents a precise analogous-path and time-equal electrical picture of the oscillations of the rocker system, and that the electrical swing pattern is joined to an input of a microprocessor, which compares the swing pattern with preset event theoretical values in constantly recurrent program sequences and if there is a deviation, produces one or more output signals, which control at least the air valves for aerating and de-aerating the pneumatic spring.

According to the instructions of the invention, it is first true that the rocker system is more or less freed of the need for the multiple sensors, which produced discrete input signals (e.g., ON/OFF or voltage YES/NO) for the earlier known seat controls, and for this purpose had to be mounted in the most varied positions of the rocker system and with precise adjustment.

It is now true that a single sensor mounted on the rocker system is sufficient to fulfill all of the requirements of an electronic seat control. The prerequisite is, however, that this single swing stroke sensor continually gives an uninterrupted sequence of electrical signals, which represent an accurate analogous-path and time-equal electrical pattern of the actual swings of the rocker system.

The signal sequences formed by the swing stroke sensor may be present as digital value sequences or as electrical analog signals. The latter are preferably generated by means of a potentiometer, but may alternatively be produced also, e.g., by means of an inductive path sensor or an opto-electronic pickup system, as they are common on the market at the present time.

The swing pattern of the rocker system which is produced electrically is placed at the input of the microprocessor according to the instructions of the invention. Thus it is of advantage that on the one hand, the processor may be arranged anywhere on the seat or remote from the seat and does not cover the constricted space within the rocker system; on the other hand, however, it has available at its input a complete and time-equal electrical swing pattern of the rocker system.

With this electrical swing pattern, the processor may question, corresponding to its operational cycle, i.e., in constantly recurrent program sequences, specific swing actual values by comparison with preset event theoretical values, whereby the preset or preadjustable event theoretical values may be changed according to a particular form of embodiment of the invention. This is an essential advantage, since now many event actual values of the oscillations of the rocker system can be detected at random, without the need for mechanical arrangement or mechanical change nor the adjustment of individual sensors on the rocker system for this purpose. The rocker system does not need a multiple arrangement of individual sensors, as this was previously known in the case of electronic controls for detecting diverse distinguishable input signals. The seat control of the invention can be correspondingly adapted simply and without problem to the respective type of seat or the respective rocker system.

Thus it is of advantage to be able to change the technical circuit processing of the event actual values within the processor questioned from the electrical swing pattern in order to adapt the control to the respective type of seat or for generating specific output signals, since this can be done by means of memory-programmable processors.

In modern seat construction, it is known that the swing behavior of the seat can be changed not only by aerating or de-aerating the pneumatic spring, but for this purpose, also, a so-called additional air volume can be added or again disconnected from the latter. Likewise it is known how to connect or disconnect an auxiliary shock absorber to more intensely attenuate the swings of the seat in case of need. The expenditure for the control of such additional elements, however, was previously correspondingly high. Now it is shown how such additional elements can be simply controlled according to the instructions of the invention.

Other objects, features and advantages of the invention shall become apparent as the description thereof proceeds when considered in connection with the accompanying illustrative drawings.

DESCRIPTION OF THE DRAWING

In the drawing which illustrates the best mode presently contemplated for carrying out the present invention.

In the following, an example of embodiment of the invention will be explained in more detail on the basis of the drawing. Here.

DESCRIPTION OF THE INVENTION

Figure 1:
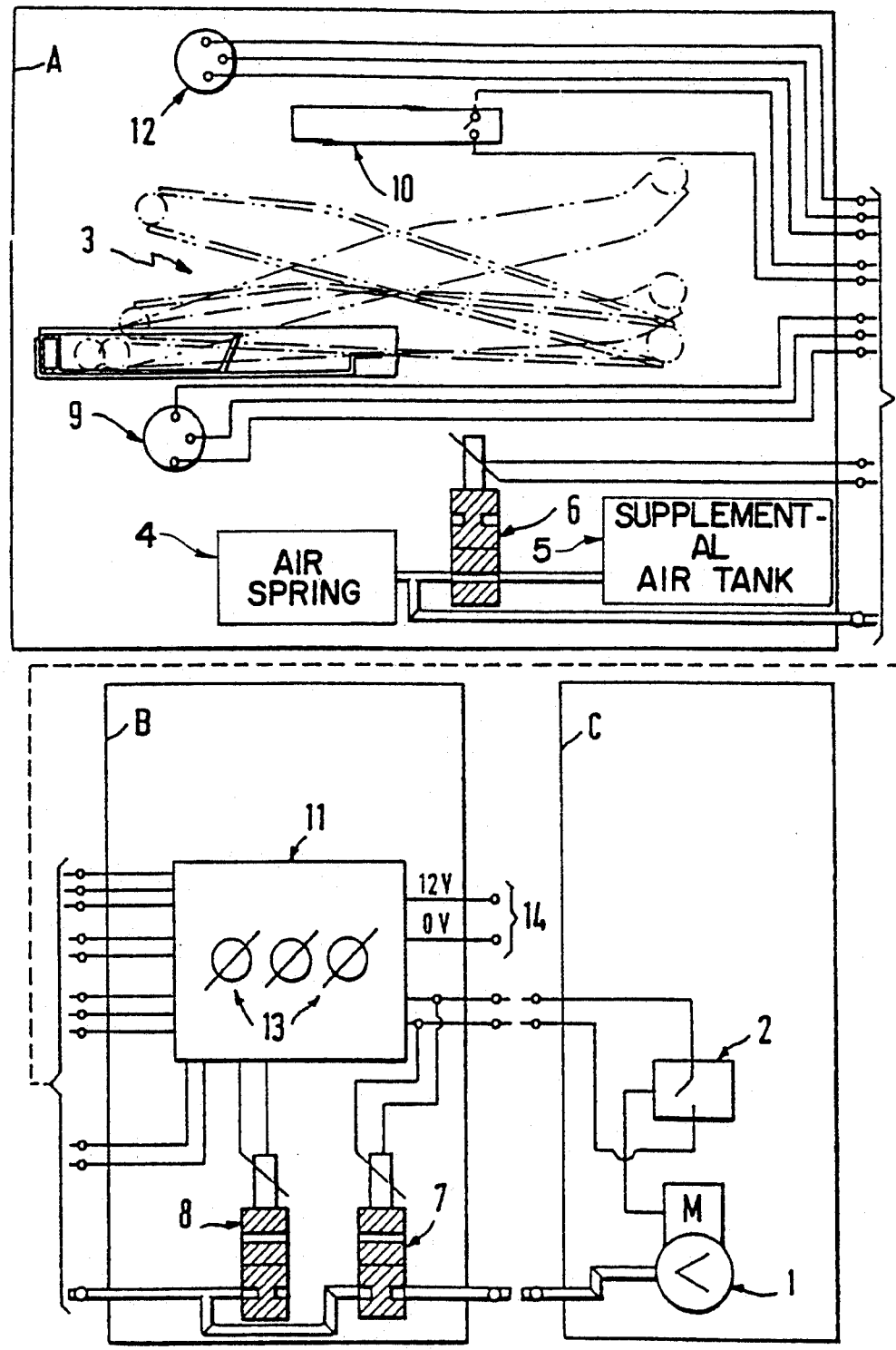
FIG. 1 shows the technical control construction of a pneumatic spring mounted vehicle seat according to the instructions of the invention.

Represented as structural components are a seating unit A, a control module B, and a compressor part C.

This is a pneumatic spring mounted seat, which possesses its own compressor 1 in compressor part C for its air pressure supply, which is turned on and off by means of a relay 2. The rocker system of the seat is represented symbolically within seating unit A and is in fact in the form of a shear rod rocker system 3 indicated by the dots and dashes, as is known sufficiently when considered in and of itself. The pneumatic spring 4 incorporated in the rocker system in the case of a concrete embodiment is symbolically shown underneath the rocker system for better illustration.

The seat is further equipped with an additional air volume 5, which may be connected or then disconnected again by means of an electromagnetically actuated valve 6 to the air volume of pneumatic spring 4.

The pneumatic spring itself is aerated or de-aerated by means of aeration valve 7 and de-aeration valve 8. Aeration valve 7 is connected together with relay 2 for control of compressor 1.

According to the invention, the rocker system has a swing-stroke sensor in the form of a potentiometer 9, which may be mounted in the simplest way between two parts of the shear rod rocker system 3, which parts can move relative to each other, so that an accurate analogous-path and time-equal electrical pattern arises for the swing strokes of the rocker system.

If a rider now sits down on the vehicle seat, the processor present in control module C is first activated by means of a seat contact switch 10.

The operational state is indicated. During the operational state, the analogous-path electrical swing pattern of the rocker system sensed by means of potentiometer 9 is continually input to processor 11. In this way, the processor is in a position to compare the electrical swing pattern with preset theoretical values in a continuous recurrent program sequence.

First, i.e., directly after activation of the control, the static theoretical middle position of the seat is questioned. This may be preset by means of potentiometer 12 mounted in an easily reachable position on the seat. If there is a deviation from the initially expected value, processor 11 produces an output signal for turning on compressor 1 and for simultaneous opening of aeration valve 7. The seat then travels into its static theoretical middle position.

Further presettings for event theoretical values can be undertaken by means of potentiometer 13 present in control module B. For example, this can be specific allowed reference variables just below the middle position so as to disconnect the compressor again after the initial high travel of the seat and to close again aeration valve 7.

Other reference variables, which may be adjusted by means of potentiometer 13 serve for the purpose of monitoring the swing behavior of the seat in the operational state, and if there are deviations to produce output signals by means of processor 11, which control de-aerating valve 8 as well as aerating valve 7 of the pneumatic spring and/or valve 6 for connecting or disconnecting additional air volume 5.

The variability in setting the allowed reference variables or the changing of the technical circuit processing of the event actual values questioned comparatively with the electrical swing pattern are hardly subject to limits due to the current state of the art of microprocessor technology.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

I claim:

1. An air suspension seat for a vehicle comprising:
a mechanical suspension system for controlling vertical movements of said seat, said suspension system including an air spring having a predetermined volume, and air valve means for selectively inflating and deflating said air spring; and
an electronic control system for controlling said air valve means comprising sensor means for sensing vertical movements of said mechanical suspension system, said sensor means outputting an uninterrupted stream of electrical output signals during movement of said suspension system, said stream of signals representing an exact position/time image of the movements of said suspension system, and
micro-processor means for selectively controlling said air valve means to inflate and deflate said air spring according to movements of said suspension system, said micro-processor means including a memory which is programmed with one or more pre-set desired values, said micro-processor means receiving said stream of signals from said sensor means and being programmed to compare by continuous recurrent program flows said stream of signals to said desired values, said micro-processor means selectively generating one or more output signals when a deviation exists between said stream of signals and said desired values, wherein said output signals are used to selectively control said air valve means.

2. In the air suspension seat of claim 1, said sensor means outputting an analog signal.

3. In the air suspension seat of claim 2, said sensor means comprising a potentiometer.

4. In the air suspension seat of claim 1, said sensor means outputting a digital signal.

5. In the air suspension seat of claim 1, said pre-established event theoretical values being modifiable.

6. In the air suspension seat of claim 1, said microprocessor comprising a memory-programmable microprocessor.

7. In the air suspension seat of claim 1, said air spring further having a supplemental air capacity for increasing the volume of said air spring and a valve for selectively connecting said supplemental air capacity to said air spring,
said micro-processor means comparing said stream of signals with at least two pre-set values by means of a logical relation and generating one or more output signals when a deviation exists, wherein said output signals are used for selectively controlling said air valve means for selectively inflating or deflating said air spring and for selectively controlling said valve for connecting said supplemental air capacity to said air spring.

8. The air suspension seat of claim 1 further comprising an adjustable shock absorber mounted to said mechanical suspension system, said micro-processor memory being programmed with a pre-set desired velocity valve of said mechanical suspension system, said micro-processor means differentiating once against time at least two actual values of said stream of signals and comparing said once differentiated signal values with said velocity value, said micro-processor means generating one or more output signals when a deviation exists, wherein said output signals are proportional to said deviation and are used to selectively control said adjustable shock absorber.

9. The air suspension seat of claim 1 further comprising an adjustable shock absorber mounted to said mechanical suspension system, said air spring further having a supplemental air capacity for increasing the volume of said air spring, and a valve for selectively connecting said supplemental air capacity to said air spring, said micro-processor memory being programmed with a pre-set desired acceleration value of said mechanical suspension system, said micro-processor means differentiating twice against time at least two actual values of said stream of signals and comparing said twice differentiated signal values with said acceleration value, said micro-processor means generating one or more output signals when a deviation exists, wherein said output signals are proportional to said deviation, and are used for selectively controlling said valve for connecting said supplemental air capacity to said air spring and for selectively controlling said adjustable shock absorber.

* * * * *